May 28, 1935.   C. R. SESSIONS   2,002,907
MOTOR PUMP
Original Filed June 8, 1921
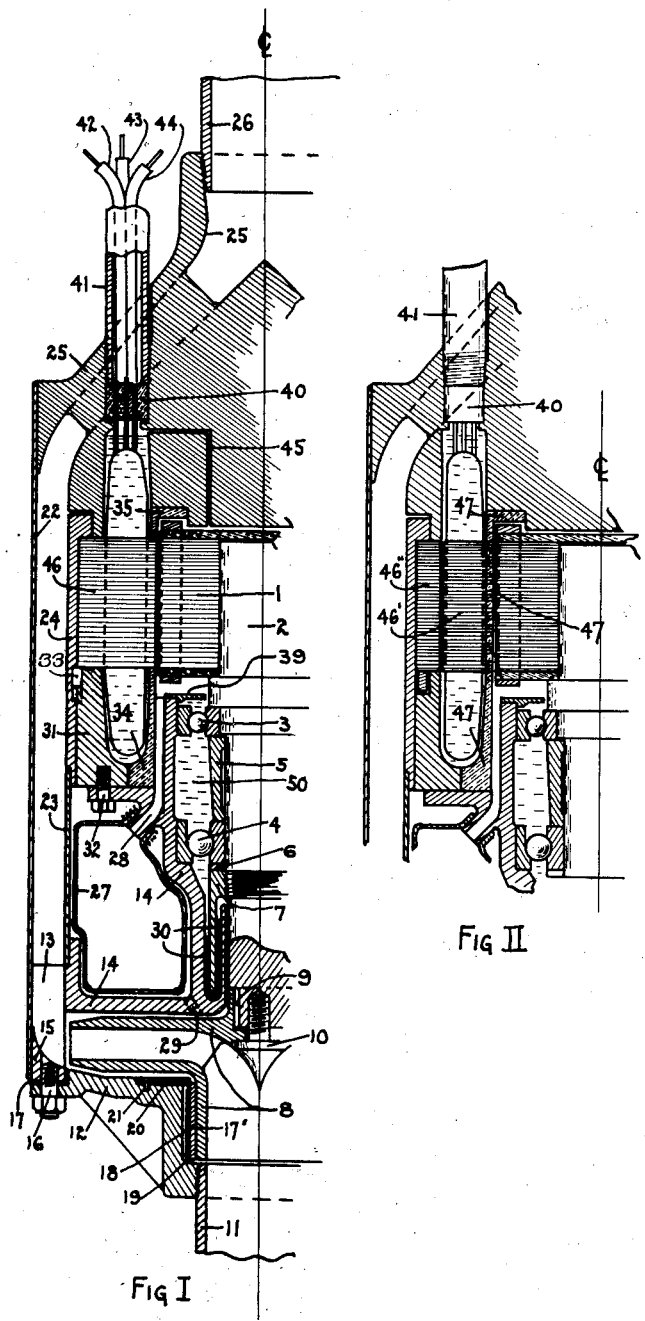
Fig I
Fig II
WITNESSES
INVENTOR
CHARLES ROBERT SESSIONS

Patented May 28, 1935

UNITED STATES PATENT OFFICE 2,002,907

MOTOR PUMP

Charles Robert Sessions, San Francisco, Calif., assignor, by mesne assignments, to Menhorn, Inc., Los Angeles, Calif., a corporation of California Application June 8, 1921, Serial No. 476,092
Renewed March 19, 1928

25 Claims. (Cl. 103—87)

This invention relates particularly to a combined motor and pump which may be submerged in the liquid to be pumped without causing injury to the motor.

An object of the invention is to provide a combined pump and motor which, because of its small size, may be submerged in the liquid in bored wells, small pits, and the like.

Another object of the invention is to provide a device, of the class described, in which mechanical friction on the operating parts is reduced to a minimum in conjunction with means for automatically lubricating the moving parts.

A further object of the invention is to provide a device, such as described, readily adaptable to varying head and capacity conditions which conduces to standardization and together with the relatively large capacity of the water cooled motor, will cheapen manufacture.

A still further object of the invention is to provide a novel form of submersible motor having a fluid seal which prevents the entrance into the motor of any of the fluid in which the motor is submerged. Other objects and advantages will appear as this description progresses.

Certain features of my invention are not, however, limited to a combination of a motor and pump, nor even to a submersible motor, but find utility in other capacities.

In this specification and the annexed drawing, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying one sheet of drawings

Fig. 1 is a vertical section through a portion of a combined motor pump, constructed in accordance with my invention.

Fig. 2 is a fragmentary section, similar to Fig. 1, showing a modified form of construction of the motor stator.

In detail, the construction illustrated in the drawing (Fig. 1) comprises, the rotor 1, of a motor, mounted on a shaft 2, and carried and supported for rotation by the radial ball bearing 3 and a combined radial and thrust ball bearing 4. The inner races of the bearings 3 and 4 fit snugly on the shaft 2 and are held in place thereon by a shoulder on the said shaft, a spacer piece 5, a lock washer 6, and a combined lock nut and seal piece or sleeve 7. The bearings 3 and 4 are immersed in lubricant 50. The lubricant is prevented from escaping into the water intake 11, by a body of mercury 30, contained in an annular recess formed in the housing 14, and into which a lip of the seal piece 7 extends to form a "fluid trap" which seals in fluid-tight relationship the junction of the shaft 2 and the housing 14 which forms a part of a motor casing enclosing the motor. A lubricant-retaining cap 39 is fastened to the top of the housing 14 for holding the lubricant 50 between the housing 14 and shaft 2.

An impeller 8 is secured on the reduced lower end of the shaft 2 by a bolt 10. A key 9 is arranged between the impeller 8 and shaft 2 to prevent said impeller from turning. The upper end of the motor is supported in a head 25 which has an outlet discharge pipe 26 connected thereto which leads to a point of discharge. The head 25 is connected by an outer shell 22 to an annular ring 15, which is connected to the circular bottom plate 12 by means of the studs 16 and gasket 17. The plate 12 has an intake pipe 11 therein into which water or the like may be drawn. The motor and pump shell would be submerged so that on rotation of the impeller 8 water is drawn into the pipe 11 and passed out from said impeller into and through the diffusion or guide vanes 13, formed integrally with the housing 14 and annular ring 15.

The hub clearance, on the suction side of the impeller, is packed or sealed by close fitting resilient collar 17' reinforced and supported by a tubular member 18. The member 18 rests on a shoulder formed in a recess in the bottom plate 12, and the said member 18 is prevented from turning by lugs 19 on said shoulder which extend into notches in the member 18. The upper edge of the collar 17' is turned over horizontally and secured on to the upper face of the bottom plate 12 by a ring disc 20 and screws 21. While the resilient collar 17' is held snugly in engagement with the impeller 8 and base plate 12 and forms a water tight joint therewith it is sufficiently flexible to follow the impeller hub and to assume an aligned position therewith.

The stator laminations 46 of the motor are carried in a shell 24 connected at its upper end to the head 25 of the pump, the lower end of said stator shell 24 being connected by the shell 23 to the housing 14. The liquid that passes from the guide vanes 13 moves upwardly in the passage, formed between the outer shell 22 and the shells 23 and 24, into the head 25 where it converges and is delivered out through the pipe 26.

A flexible air bag 27, circular in contour, is arranged around the housing 14 in a pressure-equalizing chamber defined between the shell 23 and the housing 14. The bag has an opening therein which communicates with an air passage 28 formed in the housing 14 leading to the space around the rotor 1. The shell 23, between the stator shell 24 and housing 14, protects the air bag 27 and makes a smooth water passage between the concentric shells. A plurality of passages 29 are cut through the housing 14, through which water is admitted into the pressure-equalizing chamber in contact with the outer surface of the bag 27, causing the same to be compressed until the pressure in the motor air space is equal to the external pressure on the seal around the shaft 2, formed by the seal piece 7 dipped into the mercury 30 contained in an annular cup shaped recess formed in the housing 14. The oil or lubricant 50 resting on the mercury will depress the same slightly as shown. On the external or water side of the mercury seal any air trapped at the start of the impeller would be absorbed by the revolving water with which it would mix. The bag 27, passage 28, and mercury seal recess may be so proportioned to take care of pressure variations in the pump so that the mercury will not be forced out of its cavity. Although I have shown and described pneumatic means for equalizing the pressure on the mercury seal it is to be understood that any one of the number of equivalent equalizing means might be substituted in lieu thereof. The air in the rotor space cannot be absorbed by the liquid being pumped, nor can any moisture or the like enter the rotor space through the mercury.

The housing 14 is secured to a ring base 31 holding the stator laminations 46 in the shell 24 by the use of the bolts 32. A ring 33 is secured to the stator shell 24 and extends within a recess formed in the ring base 31 for holding the stator laminations 46 during winding and assembly. A pair of insulating members 34 and 35 are arranged on opposite sides of the stator laminations 46 and are held in place by the pressure between the housing 14 and the head 25.

Lead wires 42, 43, and 44 are conveyed through a water tight conduit 41 and through an air tight plug of insulating material 40 into and through the head 25. Suitable terminals extend through the stator laminations 46 and are connected to the lead wires. The space around the stator coils is filled with oil or other insulating material. A duct 45 communicates between the top of the oil space around the stator winding and the air space above the rotor winding and hence equalizes the pressure on this air-gap surface and protects the material. The insulating pieces 34 and 35 may be omitted, together with the oil, so that, by substituting a larger bag 27 and seal, the motor may be operated simply as an enclosed motor.

In the modified construction shown in Fig. 2, I provide laminated stator teeth 46' separated from a laminated stator core 46''. The teeth 46' are held in position by insulating material moulded into the slots between the teeth. The material 47 extends above and below the stator and serves the purpose of the pieces 34 and 35 described in Fig. 1.

It should, of course, be apparent to one skilled in the art that my motor may be used as a submersible motor independent of its direct attachment to a pump in which case the fluid in which the motor is submerged will exert a pressure on the bag 27 to regulate the pressure on the mercury seal.

In the appended claims I have termed the structure enclosing the motor as a motor casing, or merely as a casing when not referring to the motor, while the structure enclosing both the pump and the motor has been termed a motor-pump housing for purposes of distinction.

Having thus described this invention, what I claim and desire to secure by Letters Patent is:—

1. A device of the class described, comprising: a motor casing; an electric motor in said casing; a shaft on said motor extending through said casing; a fluid seal, related to said motor shaft, for sealing the hub joint between said shaft and said casing in fluid-tight relationship; and means functioning upon the operation of said motor for changing the pressure on said fluid seal.

2. A device of the class described, comprising: a motor casing; an electric motor in said casing; a shaft on said motor extending through said casing; a pump connected to said shaft, said motor casing and said pump being submerged in an external fluid and changing the pressure in a zone exterior of said motor casing; a fluid-packed seal, related to said motor shaft, for sealing the hub joint between said shaft and said casing in fluid-tight relationship; and means for controlling the pressure on said fluid-packed seal as a function of the pressure in said zone.

3. A device of the class described, comprising: a motor casing; an electric motor in said casing; a shaft on said motor extending through said casing; a pump connected to said shaft; a fluid trap, related to said motor shaft, for sealing the hub joint between said shaft and said casing in fluid-tight relationship; and a pneumatic means in said casing to control the pressure on said fluid trap in response to pressure variations set up by said pump.

4. A device of the class described, comprising: a motor casing; a motor in said casing; a shaft on said motor extending through said casing; a pump operatively connected to said shaft adjacent said motor; a pressure-displaceable sealing means between said shaft and said casing; and means operable by the fluid being pumped by said pump for controlling the pressure on said sealing means.

5. In a submersible motor, the combination of: a motor casing; a stator in said casing; a rotor operable in a rotor space of said stator; a shaft on said rotor, said shaft extending through said casing; a fluid seal at the junction of said shaft and said casing, said fluid seal having surfaces respectively communicating with the interior of said motor casing and with the exterior of said casing; and means for substantially equalizing the pressures on said surfaces.

6. In a submersible motor, the combination of: a motor casing; a stator in said casing; a rotor operable in a rotor space of said stator; a shaft on said rotor, said shaft extending through said casing; a mercury seal at the junction of said shaft and said casing, said mercury having surfaces respectively communicating with the interior and exterior of said casing; and means for correspondingly changing the pressures on said mercury surfaces as the pressure on the exterior of said casing changes.

7. In a submersible motor, the combination of: a motor casing; a motor in said casing; a shaft on said motor extending through said casing; a fluid seal between said shaft and said casing; and pressure-transferring means responsive to changes of pressure outside said casing for correspondingly changing the pressures inside said casing, said pressures inside and outside said casing being transmitted to said fluid seal.

8. In combination: a casing adapted to be positioned in an external fluid and containing a body of lubricant; a motor in said casing; a shaft associated with said motor and extending from said casing; a bearing in said casing and lubricated by said lubricant for journalling said shaft; and a fluid seal for sealing the junction of said shaft and said casing, said seal having one surface communicating with said external fluid and another surface in pressure-transferring relationship with said lubricant.

9. In combination; a casing adapted to be positioned in an external fluid, said casing including a pressure-equalizing chamber communicating with the interior of said casing and with said external fluid; a shaft rotatably mounted in said casing and extending therefrom; a fluid seal for sealing the joint at the junction of said shaft and said casing, said seal having separated surfaces communicating respectively with the interior of said casing and with said external fluid; and means in said pressure-equalizing chamber and in contact with the external fluid in said chamber for maintaining the pressure in the interior of said casing substantially equal to the pressure of said external fluid.

10. In a submersible motor-pump unit, the combination of: a motor-pump housing having inlet and outlet ports therein; a motor and a pump operatively connected together and positioned in said motor-pump housing; means for retaining a body of sealing fluid in said housing to seal said motor from the external fluid in which said motor-pump unit is submerged and which external fluid is being pumped by said pump; and pressure-transfer means controlling the pressure on said body of sealing fluid in response to pressure variations of said external fluid.

11. In a submersible structure adapted to be operated beneath the surface of an external liquid, the combination of: walls defining a motor chamber and a pumping chamber, said pumping chamber communicating with said external liquid; a motor in said motor chamber; a pumping means in said pumping chamber and adapted when operated to change the pressure in said pumping chamber; connecting means operatively connecting said motor and said pumping means; sealing means at the junction of said connecting means and said walls and providing internal and external portions respectively communicating with said motor chamber and said pumping chamber; and pressure-transfer means communicating with said pumping chamber and with said internal portion of said sealing means whereby changes in pressure in said pumping chamber are transmitted to both said internal and external portions of said sealing means.

12. In a submersible structure adapted to be operated beneath the surface of an external liquid, the combination of: a casing; a shaft extending from said casing; bearing means in said casing for journalling said shaft, said casing containing a body of lubricating medium for lubricating said bearing means; walls defining a pumping chamber communicating with said external liquid; pump means in said pumping chamber and operatively connected to said shaft whereby operation of said pump means changes the pressure conditions in said pumping chamber; a seal for sealing the junction of said shaft and said casing and providing an internal portion communicating with the interior of said casing and an external portion communicating with the external liquid in said pumping chamber whereby said external portion of said seal is subjected to the changes in pressure conditions in said pumping chamber; and a pressure-transfer means communicating with said pumping chamber and with said internal portion of said seal for transferring to said internal portion of said seal the changes in pressure conditions in said pumping chamber.

13. In combination: a motor casing; an electric motor in said motor casing and including a stator providing a gas-filled rotor space and a rotor in said rotor space; a stator winding associated with said stator; walls defining a chamber around said stator winding, said chamber containing a body of liquid; and walls defining a passage communicating between said chamber and said rotor space.

14. In combination: a motor casing; an electric motor in said motor casing, and including a stator providing a gas-filled rotor space and a rotor mounted to rotate about a vertical axis, said rotor being positioned in said rotor space, said stator of said electric motor being around said rotor and adapted to rotate same; walls defining a liquid chamber below said rotor space and containing a body of liquid, the surface of which is in open communication with the gas in said rotor space; a sealing means for sealing said shaft with respect to said motor casing; and pressure-transfer means communicating with opposite sides of said sealing means for transferring pressure therebetween.

15. In combination: a motor casing; an electric motor in said motor casing and including a stator providing a gas-filled rotor space and a rotor mounted to rotate about a vertical axis, said rotor being positioned in said rotor space, said stator forming a part of said electric motor and being positioned around said rotor to rotate same; a stator winding on said stator; walls defining a chamber around said stator winding, said chamber containing a body of liquid in contact with said winding; walls defining a passage communicating between said chamber and said rotor space; walls defining a liquid chamber below said rotor space and containing a body of liquid the surface of which is in open communication with the gas in said rotor space; a sealing means for sealing said shaft with respect to said motor casing; and pressure-transfer means communicating with opposite sides of said sealing means for transferring pressure therebetween.

16. In combination in a submersible unit: a stationary member comprising walls forming a chamber; a rotatable member extending through said walls; cup means secured to one of said members and extending around said rotatable member, said cup means containing a liquid; a sleeve secured to the other of said members and extending into said liquid contained in said cup means; and pressure-transfer means communicating with opposite sides of said sleeve to correspondingly change the pressure on one side of said sleeve when the pressure on the other side of said sleeve changes, thereby preventing excessive displacement of said liquid.

17. In combination in a submersible unit: a stationary member comprising walls forming a chamber; a rotatable member extending through said walls; cup means secured to one of said members and defining an annular space extending around said rotatable member, said annular space containing a liquid; a sleeve secured to the other of said members and extending in said annular space and into said liquid therein; a bearing means positioned in said annular space for rotatably mounting said rotatable member; and pressure-transfer means communicating with opposite sides of said sleeve to correspondingly change the pressure on one side of said sleeve when the pressure on the other side of said sleeve changes, thereby preventing excessive displacement of said liquid in response to variations in pressure developed by the operation of said pump.

18. A device of the class described, including in combination: a motor casing; a motor in said casing; a shaft operatively connected to said motor; a pump operatively connected to said shaft; sealing means at the junction of said shaft and said motor casing and communicating with the interior of said motor casing; a pressure means controlling the pressure in said motor casing and including a movable member one side of which communicates with the interior of said motor casing; and means for transmitting the pressure of the fluid pumped by said pump to the other side of said member to vary the pressure in the interior of said motor casing.

19. In combination in a structure adapted to operate adjacent a zone of varying pressure: a casing; a shaft extending from said casing; a fluid-packed seal at the junction of said shaft and said casing, one portion of said seal communicating with said zone of varying pressure and another portion of said seal communicating with the interior of said casing whereby a pressure differential between said portions tends to displace the fluid in said fluid-packed seal; and a pressure-transfer means communicating with both portions of said seal and responsive to the pressure variations in said zone exerted on said one portion of said seal to correspondingly change the pressure in said casing acting on said other portion of said seal.

20. In combination in an electric motor structure adapted to operate adjacent a zone of varying pressure: walls defining a motor chamber; a motor in said motor chamber; a vertically extending shaft operatively connected to said motor and extending through said walls; pressure-transfer means for transmitting the varying pressure in said zone to said motor chamber and including walls forming a pressure-transfer chamber vertically spaced with respect to said motor chamber, said pressure-transfer means including walls defining a passage communicating between said motor chamber and said pressure-transfer chamber to transfer pressures between these chambers, said pressure-transfer means also including walls defining a passage communicating between said pressure-transfer chamber and said zone of varying pressure to transfer to said pressure-transfer chamber the variations in pressure in said zone; and means functioning upon the operation of said motor for changing the pressure in said zone.

21. In combination in a structure adapted to operate submerged in a liquid: walls forming a chamber containing a body of lubricant; a shaft extending from said chamber through said walls; a seal at the junction of said shaft and said walls and separating said lubricant from the liquid in which said structure is submerged; walls defining an auxiliary chamber communicating with said seal; means for changing the pressure in said auxiliary chamber; and pressure transfer means for transferring to said lubricant the pressure variations in said auxiliary chamber, said pressure-transfer means including a pressure-transfer chamber, walls defining a passage communicating between said pressure-transfer chamber and said chamber containing said lubricant, and walls defining a passage communicating between said pressure-transfer chamber and said zone of varying pressure whereby pressure variations in said auxiliary chamber are transmitted to said lubricant and to said seal through the action of said pressure-transfer chamber and said passages.

22. In combination in a structure adapted to operate adjacent a zone of varying pressure: walls defining a motor chamber; a motor in said chamber; pump means operatively connected to said motor for changing the pressure in said zone; and pressure-transfer means for transferring pressure between said motor chamber and said zone, said pressure-transfer means including a pressure-transfer chamber positioned between said motor and said pump means, and including walls defining a passage communicating between said pressure-transfer chamber and said motor chamber, and including walls defining a passage communicating between said pressure-transfer chamber and said zone whereby pressure variations in said zone set up by said pump means are transmitted to said motor chamber through the action of said pressure-transfer chamber and said passages.

23. A combination as defined in claim 14 in which said motor casing is positioned in a zone of varying pressure, and in which one side of said sealing means is in pressure-transferring relationship with said body of liquid in said liquid chamber and the other side of said sealing means is in pressure-transferring relationship with said zone of varying pressure, and in which said pressure-transfer means communicates with said gas-filled rotor space as well as with said opposite sides of said sealing means to maintain the pressure of said gas in said rotor space substantially equal to the pressure transmitted from said zone of varying pressure to said other side of said sealing means.

24. A combination as defined in claim 20 in which said pressure-transfer chamber is below said motor chamber, and including a wall separating said motor chamber and said pressure-transfer chamber, and in which said passage communicating between said motor chamber and said pressure-transfer chamber is formed through said wall.

25. A combination as defined in claim 20 in which said zone of varying pressure contains an external liquid and in which said motor chamber contains a body of lubricant, and including a sealing means preventing said external liquid from entering said motor chamber, said sealing means including a body of sealing fluid separating said external liquid and said lubricant and providing two separated surfaces, one in pressure-transferring relationship with said lubricant and the other in pressure-transferring relationship with said external liquid in said zone of varying pressure whereby the pressure on said other of said surfaces changes as the pressure in said zone of varying pressure changes.

CHARLES ROBERT SESSIONS.

CERTIFICATE OF CORRECTION.

Patent No. 2,002,907.  May 28, 1935.

CHARLES ROBERT SESSIONS.

It is hereby certified that error appears in the printed specification of the above numbered patent requiring correction as follows: Page 4, first column, lines 12-13-14, claim 17, strike out the words "in response to variations in pressure developed by the operation of said pump" and insert the same after the word "casing" and before the period in line 28, of claim 18; and second column, line 11-12, claim 21, for "zone of varying pressure" read auxiliary chamber; and that the said Letters Patent should be read with these corrections therein that the same may conform to the record of the case in the Patent Office.

Signed and sealed this 9th day of July, A. D. 1935.

Bryan M. Battey
Acting Commissioner of Patents.

(Seal)